United States Patent
Wu et al.

(10) Patent No.: US 8,971,581 B2
(45) Date of Patent: Mar. 3, 2015

(54) METHODS AND SYSTEM FOR AUTOMATED IN-FIELD HIERARCHICAL TRAINING OF A VEHICLE DETECTION SYSTEM

(71) Applicant: Xerox Corporation, Norwalk, CT (US)

(72) Inventors: Wencheng Wu, Webster, NY (US); Orhan Bulan, Rochester, NY (US); Yao Rong Wang, Webster, NY (US); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 144 days.

(21) Appl. No.: 13/836,310

(22) Filed: Mar. 15, 2013

(65) Prior Publication Data

US 2014/0270381 A1 Sep. 18, 2014

(51) Int. Cl.
*G06K 9/00* (2006.01)
*G08G 1/14* (2006.01)
*G06K 9/62* (2006.01)
*B60Q 1/48* (2006.01)

(52) U.S. Cl.
CPC .............. *G08G 1/14* (2013.01); *G06K 9/00785* (2013.01); *G06K 9/6262* (2013.01); *G06K 9/6267* (2013.01)
USPC .......................... 382/104; 382/291; 340/932.2

(58) Field of Classification Search
USPC ......... 382/100, 103–107, 154–155, 162–173, 382/180–181, 199, 224, 232, 254, 274, 276, 382/286–291, 305, 312; 340/932.2; 348/143; 455/18
See application file for complete search history.

(56) References Cited

U.S. PATENT DOCUMENTS

| | | | |
|---|---|---|---|
| 3,110,010 A | 11/1963 | Smith | |
| 3,158,836 A | 11/1964 | McCauley | |
| 3,376,547 A | 4/1968 | Auer, Jr. | |
| 4,812,843 A | 3/1989 | Champion, III et al. | |
| 4,847,772 A | 7/1989 | Michalopoulos et al. | |
| 5,091,727 A | 2/1992 | Mahmood | |
| 5,103,400 A | 4/1992 | Yamada et al. | |
| 5,131,020 A | 7/1992 | Liebesny et al. | |
| 5,163,000 A | 11/1992 | Rogers et al. | |
| 5,199,108 A * | 3/1993 | Morgan et al. | 455/18 |
| 5,241,380 A * | 8/1993 | Benson et al. | 348/143 |
| 5,343,237 A | 8/1994 | Morimoto | |
| 5,396,429 A | 3/1995 | Hanchett | |
| 5,432,508 A | 7/1995 | Jackson | |
| 5,504,314 A | 4/1996 | Farmont | |
| 5,509,082 A | 4/1996 | Toyama et al. | |
| 5,526,041 A | 6/1996 | Glatt | |
| 5,649,300 A | 7/1997 | Snyder et al. | |
| 5,666,157 A | 9/1997 | Aviv | |

(Continued)

OTHER PUBLICATIONS http://www.nytimes.com/2011/09/19/nyregion/uprooting-the-old-familiar-parking-meter.html?_4=1&goback+%2Egde_153603_member_72027013, Dated Sep. 18, 2011; 3 pgs.

(Continued)

*Primary Examiner* — Seyed Azarian
(74) *Attorney, Agent, or Firm* — Fay Sharpe LLP

(57) ABSTRACT

Disclosed are methods and systems for detecting one or more vehicles in video captured from a deployed video camera directed at a parking region. According to one exemplary embodiment, disclosed is a method of training a deployed classifier associated with the video camera, where a generic classifier is initially used to obtain high confidence training samples from the video camera, the high confidence training samples subsequently used to train the deployed classifier.

22 Claims, 11 Drawing Sheets

(56) References Cited

U.S. PATENT DOCUMENTS

| | | | |
|---|---|---|---|
| 5,748,107 | A | 5/1998 | Kersken et al. |
| 5,751,973 | A | 5/1998 | Hassett |
| 5,777,951 | A | 7/1998 | Mitschele et al. |
| 5,910,782 | A | 6/1999 | Schmitt et al. |
| 5,940,481 | A | 8/1999 | Zeitman |
| 6,285,297 | B1 | 9/2001 | Ball |
| 6,442,474 | B1 | 8/2002 | Trajkovic et al. |
| 2012/0057756 | A1* | 3/2012 | Yoon et al. ............. 382/104 |
| 2012/0148094 | A1* | 6/2012 | Huang et al. ............ 382/103 |
| 2012/0148105 | A1* | 6/2012 | Burry et al. ............. 382/105 |
| 2014/0085112 | A1* | 3/2014 | Gruteser et al. ......... 340/932.2 |

OTHER PUBLICATIONS

Wren et al., "Pfinder: Real-Time Tracking of the Human Body", in IEEE Transactions on Pattern Analysis and Machine Intelligence, Jul. 1997, vol. 19, No. 7, pp. 780-785.

Friedman et al., "Image segmentation in video sequences: A probabilistic approach", in Proc. of the Thirteenth Conference on Uncertainty in Artificial Intelligence (UAI), Aug. 1-3, 1997, p. 1-13.

Stauffer et al., "Adaptive background mixture models for real-time tracking", in Proc. of the 1999 Conference on Computer Vision and Pattern Recognition (CVPR '99), 1999, 7 pages.

Makarov et al., "Intrusion detection using extraction of moving edges", in $12^{th}$ IAPR Int. Conf. on Pattern Recognition, vol. 1 of IAPR, pp. 804-807, IEEE Press, 1994.

Paragious et al., "Detection and location of moving objects using deterministic relaxation algorithms", Vienna, Austria, Aug. 1996, 5 pages.

Oliver et al., "A Bayesian Computer Vision System for Modeling Human Interactions", IEEE Transactions on PAMI, pp. 831-843.

Lo et al., "Automatic congestion detection system for underground platforms, "Proc. of 2001 Int Symp. on Intell. Multimedia, Video and Speech Processing, pp. 158-161.

Prati et al., "Shadow Detection Algorithms for Traffic Flow Analysis: a Comparative Study", In Proc. IEEE Intelligent Transportation Systems, 2001, p. 1-6.

Cucchiara et al., "Improving Shadow Suppression in Moving Object Detection with HSV Color Information", Proc. of IEEE Intelligent Transportation Systems, 2001, p. 334-339.

http://www.sanjoseca.gov/transportation/onstreet_regulations.htm, Aug. 6, 2012, 3 pages.

Lima et al., "High Definition Video Broadcast Over Core IP Networks", Mar. 2006, 11 pages.

http://www.portlandoregon.gov/transportation/article/59926, retrieved from the internet Aug. 6, 2012.

http://vancouver.ca/bylaws/2849c.pdf, Street and Traffic By-Law No. 2849, Oct. 18, 2011, 92 pages.

http://parkitnyc.com/parking-nyc/nyc-parking-tickets/, retrieved from the internet Aug. 6, 2012, 3 pages.

Agarwal et al., "Learning to detect objects in images via a sparse, part-based representation", Pattern Analysis and Machine Intelligence, IEEE Transactions on, vol. 26, No. 11, p. 1-16, Nov. 2004.

Tsai et al., "Vehicle Detection Using Normalized Color and Edge Map," Image Processing, IEEE Transactions on, vol. 16, No. 3, pp. 850-864, Mar. 2007.

Duncan, et al., "Temporal edges: The detection of motion and the computation of optical flow", in Proc. Second Int. Conf. Comput. Vision, Tampa, FL, Dec. 1988, pp. 374-382.

Comaniciu et al., "Real-time tracking of non-rigid objects using mean shift", in: Proceedings of IEEE Conference on Computer Vision and Pattern Recognition (CVPR'00), South Carolina, 2000, p. 1-8.

Kass et al., "Snakes: Active Contour Models", Int'l Journal of Computer Vision, pp. 321-331, 1988.

Dickmanns et al., "Dynamic monocular machine vision", Machine Vision and Applications p. 223-240, 1988. C.

Gustafsson et al., "Particle Filters for Positioning, Navigation and Tracking", IEEE Transactions on Signal Processing, 2002, p. 1-13.

U.S. Appl. No. 13/835,386, filed Mar. 15, 2013, Bulan et al.

U.S. Appl. No. 13/914,752, filed Jun. 11, 2013, Bulan et al.

Ma et al., "Edge-based rich representation for vehicle classification", Proc. of IEEE Computer Vision (ICCV), 2005, 8 pages.

http://warondriving.com/post/9215745267/los-angeles-stop-sign-cameras, "War on Driving", 9 pages, Aug. 21, 2011.

http://www.thenewspaper.com/news/17/1742.asp, "Stop Sign Ticket Cameras Developed", May 9, 2007, 1 pg.

Lowe, "Distinctive Image Features from Scale-Invariant Keypoints", International Journal of Computer Visions, 2004, pp. 1-28.

Lucas et al., "An Iterative Image Registration Technique with an Application to Stereo Vision", pp. 674-679.

Matas et al., "Robust Wide Baseline Stereo From Maximally Stable External Regions", BMVC, 2002, pp. 384-393.

Black et al., "A Model for the Detection of Motion over Time", Proceedings of the International Conference on Computer Vision, Osaka, JP, Dec. 1990, 5 pages.

Harris et al., "A Combined Corner and Edge Detector", Plessey Research Roke Manor, UK, The Plessey Company plc., 1988, pp. 147-152.

Bay et al., "SURF: Speeded Up Robust Features", pp. 1-14, 2006, https://lirias.kuleuven.be/bitstream/123456789/71383/1/Bay_Tuytelaars_VanGool-surf-eccv06.pdf.

Wiegand et al., "Overview of the H.264/AVC Video Coding Standard", IEEE, Jul. 2003, p. 560-576.

U.S. Appl. No. 13/277,719, filed Oct. 20, 2011, Bulan et al.

U.S. Appl. No. 13/613,174, filed Sep. 13, 2012, Bernal et al.

http://www.osilaserscan.com/Products/Vehicle-Detection-and-Classification.aspx, 1 page.

http://www.nyc.gov/html/dof/html/parking/violation_codes.shtml, 4 pages.

http://www.nyc.gov/html/dot/html/motorist/truckrouting.shtml, 2 pages.

"High Definition Video Broadcast Over Core IP Network", Claudio R. Lima et al. Sprint-Nextel, 1 Adrian Court, Burlingame, CA 94010, USA, 11 pages.

"The H.264 Advanced Video Compression Standard," Iain E. Richardson.

"Determining Optical Flow," B. K. P. Horn and B. G. Schunck, Artificial Intelligence 17 (1981), pp. 185-203.

"Survey on Block Matching Motion Estimation Algorithms and Architectures with New Results," Y. W. Huang et al., Journal of VLSI Signal Processing Systems 42, Manufactured in the Netherlands, copyright 2006, Springer Science + Business Media, Inc., pp. 297-320.

Z. Zhang, "A Flexible New Technique for Camera Calibration," IEEE Transactions on Pattern Analysis and Machine Intelligence, vol. 22, No. 11, Nov. 2000, pp. 1330-1334.

http://ladot.lacity.org/tf_Trucks_on_Residential_Streets.htm, 1 page.

http://vatruckweb.vdot.virginia.gov/VaTruckRestrictions.aspx, 1 page.

http://www.cotrip.org/roadConditions.htm, 1 page.

U.S. Appl. No. 13/441,294, filed Apr. 6, 2012, Bernal et al.

U.S. Appl. No. 13/441,253, filed Apr. 6, 2012, Bulan et al.

U.S. Appl. No. 13/441,269, filed Apr. 6, 2012, Bulan et al.

U.S. Appl. No. 13/461,191, filed May 1, 2012, Fan et al.

U.S. Appl. No. 13/684,817, filed Nov. 26, 2012, Rong et al.

http://streetsmarttechnology.com, 2 pages, copyright 2011.

http://www.alibaba.com/product-gs/373281312/Ultrasonic_Parking_Sensor.html, 3 pages, copyright 1999-2013.

http://en.wikipedia.org/wiki/Hough_transform; 10 pages, Jan. 9, 2013.

http://www.cs.brown.edu/~pff/latent/, version 5, Sep. 5, 2012, 3 pages (http:people.cs.uchicago.edu/~rbg/latent/).

N. Dalal and B. Triggs "Histograms of Oriented Gradients for Human Detection", in 2005, CVPR, 8 pages.

T. Ojala, M. Pietikainen, and D. Harwood, "A Comparative Study of Texture Measures With Classification Based on Feature Distributions", 1996 Pattern Recognition, vol. 29, pp. 51-59, Department of Electrical Engineering, Oulu, Finland.

(56) References Cited

OTHER PUBLICATIONS

M. Nilsson, J. Nordberg, and I. Claesson, "Face Detection Using Local Smqt Features and Split Up Snow Classifier", IEEE International Conference on Acoustics, Speech, and Signal Processing, 2007, Blekinge Institute of Technology, Ronneby, Sweden, pp. II-589 to II-592.

F. Perronnin and C. Dance, "Fisher Kernels on Visual Vocabularies for Image Categorization", CVPR, 2007, Xerox Research Centre Europe, Meylan, France, 8 pages.

G. Csurka, C. Dance, J. Willamowski, L. Fan and C. Bray, "Visual Categorization With Bags of Keypoints", ECCV SLCV, 2004, 16 pages.

F. Perronnin, J. Sanchez and T. Mensink, "Improving the Fisher Kernel for Large-Scale Image Classification", ECCV, 2010, Xerox Research Centre Europe, 14 pages.

A. Neubeck and L. V. Gool, "Efficient Non-Maximum Suppression", ICPR, 2006, Computer Vision Lab, Zurich, Switzerland, 6 pages.

P. Felzenszwalb, R. Girshick, D. McAllester, D. Ramanan, "Object Detection With Discriminatively Trained Part-Based Models," IEEE Transactions on Pattern Analysis and Machine Intelligence, vol. 32, No. 9, Sep. 2010, pp. 1627-1645.

Constantine Papageorgiou and Tomaso Poggio, "A Trainable System for Object Detection", International Journal of Computer Vision, 38(1), pp. 15-33, 2000, Netherlands.

\* cited by examiner

METHODS AND SYSTEM FOR AUTOMATED IN-FIELD HIERARCHICAL TRAINING OF A VEHICLE DETECTION SYSTEM

BACKGROUND

The present disclosure relates to a video-based method and system for efficient vehicle detection/localization in still images obtained from a fixed video camera. The disclosed method and system are applicable to parking space management. However, it is to be appreciated that the present exemplary embodiments are also applicable to other like applications.

One challenge that parking management companies face while managing on-street parking is an accurate detection of available spaces. Conventional methods for detecting vehicle occupancy in parking spaces include non-video based sensing solutions. For example, "puck-style" or in-ground sensors, shown in FIG. 1, typically use magnetometer readings to sense when a vehicle is detected in a parking space. Ultrasonic sensors, as shown in FIG. 2, operate by sending and receiving high frequency sonic waves and evaluating a parking area based on processing a signal that has been reflected back to the ultrasonic sensor. The detected information is wirelessly communicated to interested parties. One disadvantage associated with these sensor-based methods is a high cost for installation and maintenance of the sensors. In addition, the maintenance or replacement of a sensor may reduce parking efficiency if a parking space is made unavailable for the service work.

Another method being explored is a video-based solution. This method is shown in FIG. 3 and includes monitoring on-street parking spaces using non-stereoscopic video cameras. The cameras output a binary signal to a processor, which uses the data for determining occupancies of the parking spaces.

One shortcoming of both technologies is that they are designed for, and limited to, single-space parking configurations. On-street parking can be provided in two different configurations. A first configuration is shown in FIG. 4 and includes single-space parking, also known as stall-based parking, in which each parking space is defined in a parking area by clear boundaries. The parking spaces are typically marked by lines (shown in phantom) that are painted on the road surface to designate one parking space per vehicle. The second configuration is shown in FIG. 5 and includes multi-space parking, in which a long section of street is designated as a parking area to accommodate multiple vehicles. In this configuration, there are no pre-defined boundaries that designate individual parking stalls, so a vehicle can park at any portion extending along the parking area. In many instances, the multi-space parking configurations are more efficient because, when spaces are undesignated, drivers aim to fit more vehicles in a multi-space parking area having a same length as a single-space parking area.

At present, many departments of transportation are transitioning from single-space parking configurations to the multi-space parking configurations. Cities are eliminating parking meters and single-space parking configurations to reduce maintenance and other costs. The sensor-based methods are best suited for parking areas where painted lines typically demark a defined parking space for a single vehicle. However, an incorporation of the sensor-based methods for use in multi-space parking configurations is conceptually difficult and expensive to continue. Accordingly, this transition reduces a need for in-ground and other sensor-based methods.

Given the comparatively lower cost of a video surveillance camera, a video-based solution offers a better value if it is incorporated into a management scheme for monitoring multi-space parking configurations, as well as some applications of single-space street parking. Another advantage of a video-based solution is that one video camera can typically monitor and track several parking spots, whereas multiple sensors may be needed to reliably monitor one parking space in the single-space parking configuration. Additionally, maintenance of the video cameras is likely to be less disruptive than maintenance of in-ground sensors.

INCORPORATION BY REFERENCE

U.S. Pat. No. 6,285,297, issued Sep. 4, 2001, by Jay H. Ball, and entitled "Determining The Availability Of Parking Spaces";

U.S. Patent Publication No. 2014/0266804, published Sep. 18, 2014, by Bulan et al., entitled "Two-Dimensional And Three-Dimensional Sliding Window-Based Methods And Systems For Detecting Vehicles";

U.S. application Ser. No. 13/441,294, filed Apr. 6, 2012, by Bernal et al., entitled "Video-Based Detector And Notifier For Short-Term Parking Violation Enforcement";

U.S. application Ser. No. 13/441,253, filed Apr. 6, 2012, by Bulan et al., entitled "Video-Based System And Method For Detecting Exclusion Zone Infractions";

U.S. application Ser. No. 13/441,269, filed Apr. 6, 2012, by Bulan et al., and entitled "A System And Method For Available Parking Space Estimation For Multispace On-Street Parking";

U.S. application Ser. No. 13/461,191, filed May 1, 2012, by Fan et al., entitled "System And Method For Street-Parking-Vehicle Identification Through License Plate Capturing";

U.S. application Ser. No. 13/684,817, filed Nov. 26, 2012, by Rong et al., entitled "System And Method For Estimation Of Available Parking Space Through Intersection Traffic Counting";

http://streetsmarttechnology.com, 2 pages, copyright 2011;

http://www.alibaba.com/product-gs/373281312/Ultrasonic_Parking_Sensor.html, 3 pages, copyright 1999-2013;

http://en.wikipedia.org/wiki/Hough_transform; 10 pages, Jan. 9, 2013;

http://www.cs.brown.edu/~pff/latent/, version 5, Sep. 5, 2012, 3 pages (http:people.cs.uchicago.edu/~rbg/latentJ);

Wu et al. "Automated In-Field Hierarchical Training Of Vehicle Detector For General Deployment Of Vehicle Detection Cameras";

N. Dalal and B. Triggs "Histograms Of Oriented Gradients For Human Detection", in 2005, CVPR, 8 pages;

T. Ojala, M. Pietikäinen, and D. Harwood, "A Comparative Study Of Texture Measures With Classification Based On Feature Distributions", 1996 Pattern Recognition, volume 29, pages 51-59, Department of Electrical Engineering, Oulu, Finland;

M. Nilsson, J. Nordberg, and I. Claesson, "Face Detection Using Local Smqt Features And Split Up Snow Classifier", IEEE International Conference on Acoustics, Speech, and Signal Processing, 2007, Blekinge Institute of Technology, Ronneby, Sweden, pages II-589 II-592;

F. Perronnin and C. Dance, "Fisher Kernels On Visual Vocabularies For Image Categorization", CVPR, 2007, Xerox Research Centre Europe, Meylan, France, 8 pages;

G. Csurka, C. Dance, J. Willamowski, L. Fan and C. Bray, "Visual Categorization With Bags Of Keypoints", ECCV SLCV, 2004, 16 pages;

F. Perronnin, J. Sanchez and T. Mensink, "Improving The Fisher Kernel For Large-Scale Image Classification", ECCV, 2010, Xerox Research Centre Europe, 14 pages;

A. Neubeck and L. V. Gool, "Efficient Non-Maximum Suppression", ICPR, 2006, Computer Vision Lab, Zurich, Switzerland, 6 pages;

P. Felzenszwalb, R. Girshick, D. McAllester, D. Ramanan, "Object Detection With Discriminatively Trained Part-Based Models," IEEE Transactions on Pattern Analysis and Machine Intelligence, Vol. 32, No. 9, September 2010, pages 1627-1645; and Constantine Papageorgiou and Tomaso Poggio, "A Trainable System For Object Detection", International Journal of Computer Vision, 38(1), pages 15-33, 2000, Netherlands; are incorporated herein by reference in their entirety.

BRIEF DESCRIPTION

In one embodiment of this disclosure, described is a computer implemented method of detecting a vehicle in video, the video acquired from a fixed parking occupancy video camera including a field of view associated with a parking region, the method comprising a) capturing video from the fixed parking occupancy video camera; and b) performing a sliding window-based space search for a vehicle within the captured video, the sliding window-based space search extracting one or more features associated with each of a plurality of windows and accessing an operatively associated second classifier to classify each window as including a vehicle or not including a vehicle, wherein the second classifier is trained using high confidence training samples acquired from samples of video obtained from the fixed parking occupancy video camera operatively associated with a first classifier, the samples including positive (vehicle) samples of video and negative (non-vehicle) samples of video.

In another embodiment of this disclosure, described is a vehicle detection system associated with a parking region, the vehicle detection system comprising a fixed parking occupancy video camera including a field of view associated with the parking region; and a controller operatively associated with the fixed parking occupancy video camera, the controller configured to execute computer instructions to perform a process of detecting a vehicle in video including a) capturing video from the fixed parking occupancy video camera; and b) performing a sliding window-based space search for a vehicle within the captured video, the sliding window-based space search extracting one or more features associated with each of a plurality of windows and accessing a second classifier to classify each window as including a vehicle or not including a vehicle, wherein the second classifier is trained using high confidence training samples acquired from samples of video obtained from the parking occupancy video camera operatively associated with a first classifier, the samples including positive (vehicle) samples of video and negative (non-vehicle) samples of video.

In yet another embodiment of this disclosure, described is a computer implemented method of training a second classifier associated with a second vehicle detection system, the second vehicle detection system operatively associated with a second fixed parking occupancy video camera including a second field of view associated with a second parking region, the method comprising a) training a first classifier associated with a first vehicle detection system, the first vehicle detection system operatively associated with a first fixed parking occupancy video camera including a first field of view associated with a first parking region; b) acquiring high confidence training samples from the second vehicle detection system operatively associated with the first classifier; and c) training the second classifier using the acquired high confidence training samples.

DETAILED DESCRIPTION

Figure 1:
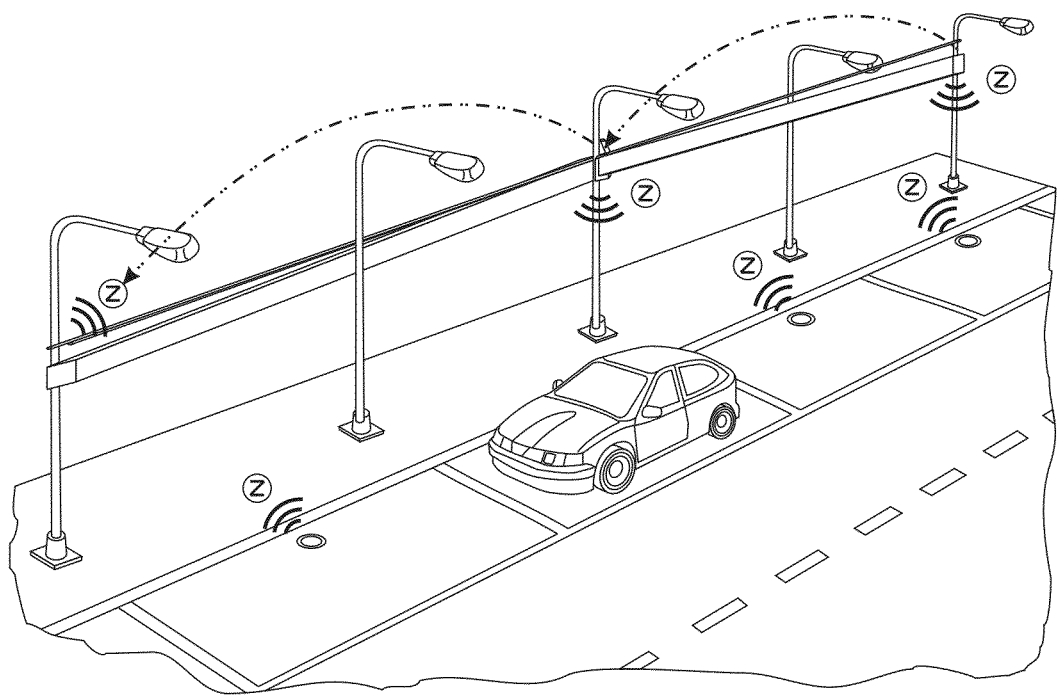
FIG. 1 shows a "puck-style" sensor-based method for detecting parking space occupancy according to the PRIOR ART.
Figure 2:
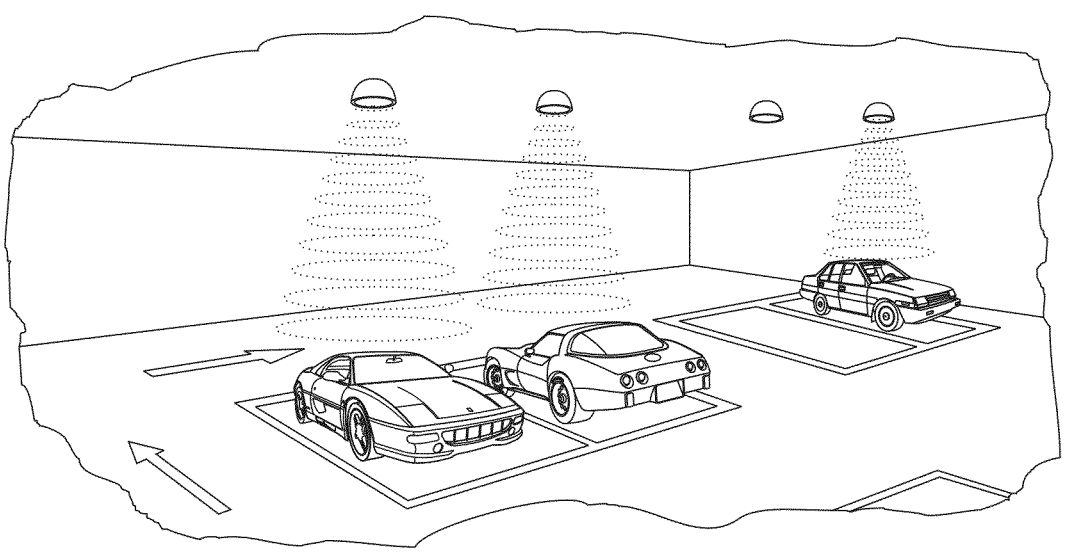
FIG. 2 shows an ultrasonic sensor-based method for detecting parking space occupancy according to the PRIOR ART.
Figure 3:
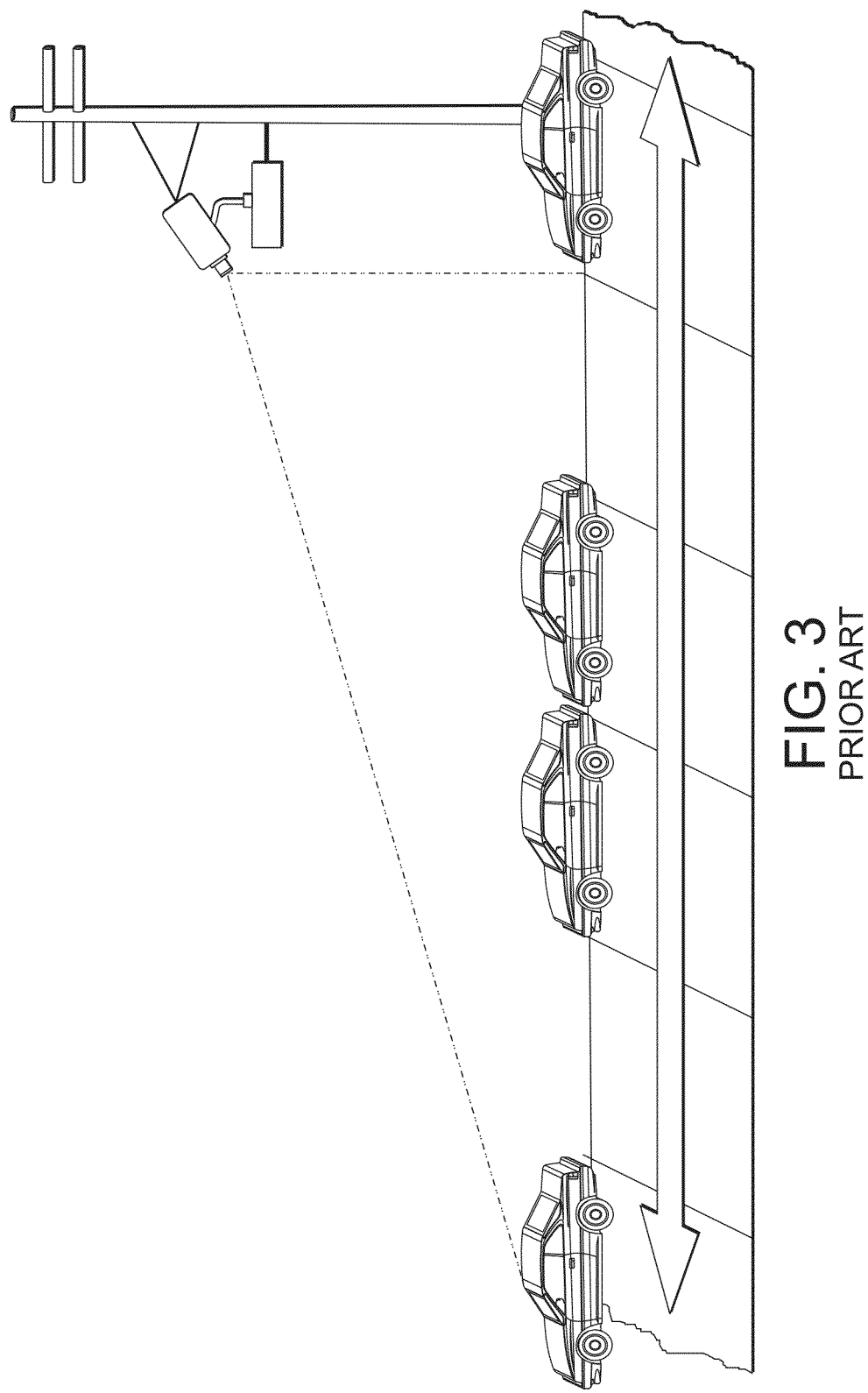
FIG. 3 shows a video-based method for detecting parking space occupancy according to the PRIOR ART.
Figure 4:
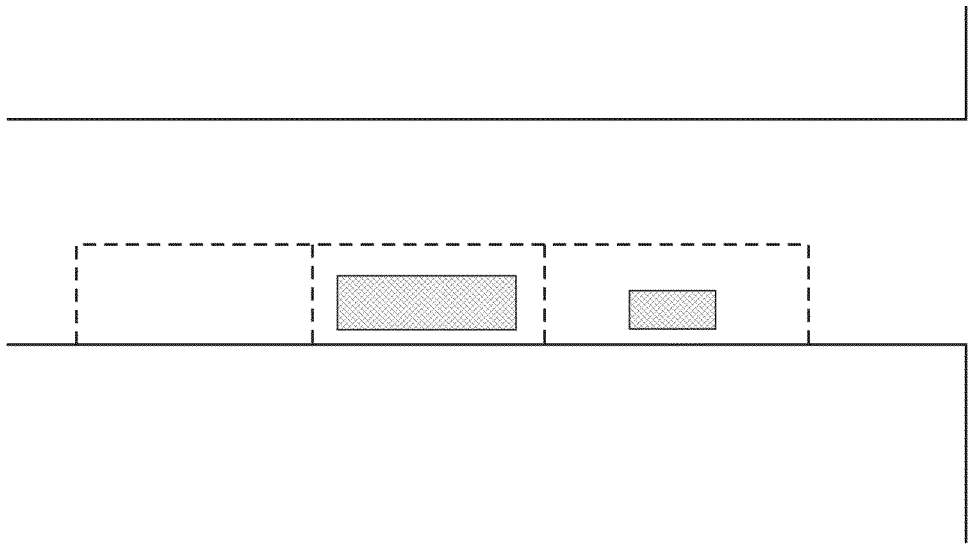
FIG. 4 shows a single-space parking configuration.
Figure 5:
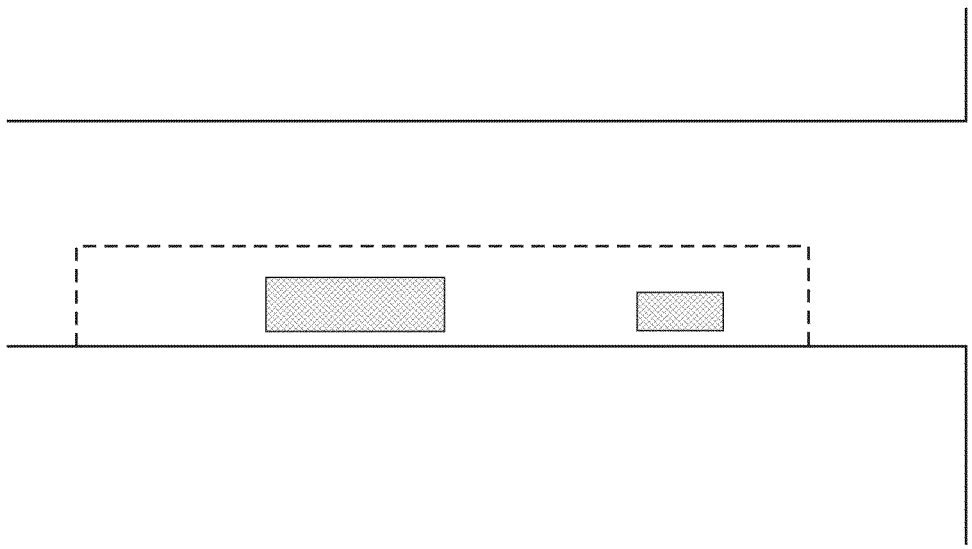
FIG. 5 show a multiple-space parking configuration.

This disclosure provides an automated training method and system for vehicle detection for generally deployed vehicle detection systems such as on-street parking video cameras. According to one exemplary embodiment, a method is provided including: (a) In a first vehicle detection system including a first video camera, train the system, i.e. classifier, using manually labeled image data or data labeled through some other means; (b) Acquire high confidence training samples for a second vehicle detection system including a second video camera using the trained classifier associated with the first vehicle detection system. Furthermore, use the first vehicle detection classifier with the second vehicle detection system for a target region with a vehicle detection threshold set to minimize false positives for vehicle image regions to acquire high confidence positive (vehicle) samples in the training set. In addition, use the first vehicle detection classifier with the second vehicle detection system with a detection threshold set to minimize false negatives to acquire high confidence negative (non-vehicle) samples in the training set. (c) Use the high confidence images to train a second classifier which is associated with the second vehicle detection system, or if needed, repeat the above steps to do further training. (d) Deploy the second vehicle detection system including the second classifier within the targeted region of the vision-based parking management system. The benefits of the dis closed embodiments include the automation of deploying a second, or more, vehicle detection system which saves the manual labor cost associated with labeling the ground truth associated with the second vehicle detection system. The disclosed method and system is very well suited for camera detection systems that have similar but not identical views, such as where poles for camera mounting are mounted in a fixed pattern block to block.

object detection/recognition as well as a human under broad situations. Under more constrained conditions (e.g., car vs. non-car at fixed pose), it is possible to develop computer vision algorithms that can detect objects of interest with much higher accuracy. In fact, the above referenced copending patent application provides an accurate and efficient vehicle detection method and system that is adequate for parking occupancy determination based on computer vision trained classifier techniques.

TABLE 1

|                  | aero | bicycle | bird  | boat  | bottle | bus  | car  | cat  | chair | cow  | table |
|------------------|------|---------|-------|-------|--------|------|------|------|-------|------|-------|
| without context  | 39.5 | 48.2    | 11.4  | 12.3  | 28.6   | 42.3 | 40.4 | 25.0 | 17.4  | 20.5 | 15.3  |
| with context     | 43.6 | 50.8    | 15.1  | 14.1  | 30.2   | 45.6 | 41.8 | 27.3 | 18.9  | 22.1 | 15.8  |

|                  | dog  | horse | mbike | person | plant | sheep | sofa | train | tv   | mean |
|------------------|------|-------|-------|--------|-------|-------|------|-------|------|------|
| without context  | 14.5 | 42.1  | 44.4  | 41.9   | 12.7  | 24.3  | 16.5 | 43.3  | 32.2 | 28.6 |
| with context     | 18.2 | 45.7  | 47.3  | 43.8   | 14.3  | 26.4  | 18.2 | 46.8  | 33.7 | 31.0 |

As discussed in the background section, state of the art computer vision object detection/recognition algorithms are being used for detecting vehicles from on-street parking occupancy detection cameras. To achieve the best detection performance, the algorithms typically require offline training, where training data is manually labeled video taken with the same camera. See "Two-Dimensional And Three-Dimensional Sliding Window-Based Methods And Systems For Detecting Vehicles" by Bulan et al. and Constantine Papageorgiou and Tomaso Poggio, "A Trainable System For Object Detection", International Journal of Computer Vision, 38(1), pages 15-33, 2000, Netherlands. In real applications with large-scale deployments, numerous video cameras are potentially deployed at various locations with different geometric configurations, where the manual approach to training becomes cumbersome. This disclosure provides a hierarchical training approach to automate an offline training process in the field for each of the cameras used in one or more target regions, while resulting in minimal loss of object, i.e. vehicle, detection performance.

One of the critical steps in a video-based parking management is the detection of parked vehicles and their exact positions in the parking area. State of the art computer vision object detection algorithms have been applied to this task. See copending patent application "Two-Dimensional And Three-Dimensional Sliding Window-Based Methods And Systems For Detecting Vehicles" by Bulan et al. Although much progress has been made in the past 10 years, general object detection/recognition remains challenging in computer vision. For example, Table 1 below shows the detection performance of one of the current approaches. SP. Felzenszwalb, R. Girshick, D. McAllester, D. Ramanan, "Object Detection With Discriminatively Trained Part-Based Models," IEEE Transactions on Pattern Analysis and Machine Intelligence, Vol. 32, No. 9, September 2010, pages 1627-1645, on the PASCAL VOC 2009 data set. As shown in Table 1, the accuracy of car or bus detection is only about 40%, which is nowhere near an acceptable level for applications such as vehicle parking occupancy determination. However, the context behind this table needs to be considered. The performance is evaluated with a challenging/generic data set, where images may be acquired under various poses, natural surroundings, weather conditions etc. The goal of such a test is to evaluate whether a computer vision method can perform Current computer vision approaches present trade-offs between accuracy and effort in training dedicated classifiers for each camera viewing condition. By limiting the operation conditions, accurate vision-based vehicle detection systems for parking applications are able to be developed. However, re-training the detection system, i.e. the classifier, is required whenever the operation condition of the camera and system deviates from the initial training conditions (e.g., from one site to another). The training phase typically requires collecting and labeling training samples, and adjusting detection thresholds for balancing between false-positives and false negatives, etc., which can be costly if the system needs to perform such training manually for each site. One approach to minimize this training effort is to constrain the camera configuration and field of view (FOV) for all sites to be very similar. However, limited control exists over the sites where video cameras are needed and deployed. Therefore, it is the objective of the methods and systems disclosed herein to reduce or eliminate some or all of the manual intervention in the training stage of vision-based vehicle detection systems for large-scale deployment.

Provided herein and further described below is an automated hierarchical training method for vehicle detection from generally deployed video camera systems, such as on-street parking video cameras. The method utilizes a two-level training approach to automate the training of one or more site-specific vehicle detection systems and thus eliminate all or part of the manual intervention required for training classifiers for general deployment of parking occupancy monitoring applications. In one embodiment, a generic classifier(s) is tuned to penalize relatively more for false-positives and is used to automatically collect positive training samples over time. Intuitively, generic classifier(s), such as those disclosed in P. Felzenszwalb, R. Girshick, D. McAllester, D. Ramanan, "Object Detection with Discriminatively Trained Part Based Models," IEEE Transactions on Pattern Analysis and Machine Intelligence, Vol. 32, No. 9, September 2010, may miss many vehicles for a particular site, but the use of a suitable threshold is likely to detect vehicles with high confidence at different poses with the generic training, i.e. not site specific, to obtain positive samples of vehicles. Similarly, the generic classifier(s) may be tuned to penalize relatively more false negatives to collect negative, i.e. non-vehicle, training samples over time. These collected samples are then used to train a more accurate and site-specific classifier that is deployed.

According to one exemplary embodiment, a method of training a deployed classifier includes the following steps:

(a) In a first camera detection system, training the system classifier to detect vehicles in a first region using manually labeled image data or data labeled through some other means.

(b) Acquiring high confidence training samples for a second camera vehicle detection classifier for use with another target region, where the second camera vehicle detection system initially uses the trained classifier from the first camera detection system to classify video samples acquired from the second camera, for example, sub-regions of video samples.

Using the first detection classifier with the second vehicle detection system at the target region associated with the second vehicle detection system, the detection threshold is set to minimize false positives for vehicle image regions, to acquire high confidence positive (vehicle) samples for the training set.

In addition, using the first vehicle detection classifier with the second vehicle detection system at the target region associated with the second vehicle detection system, the detection threshold is set to minimize false negatives and acquire high confidence negative (non-vehicles) samples for the training set.

(c) Using the high confidence images generated above at the target region associated with the second vehicle detection system, train the second vehicle detection system classifier.

(d) Deploying the second vehicle detection system within the target region of the vision-based parking management system.

Figure 6:
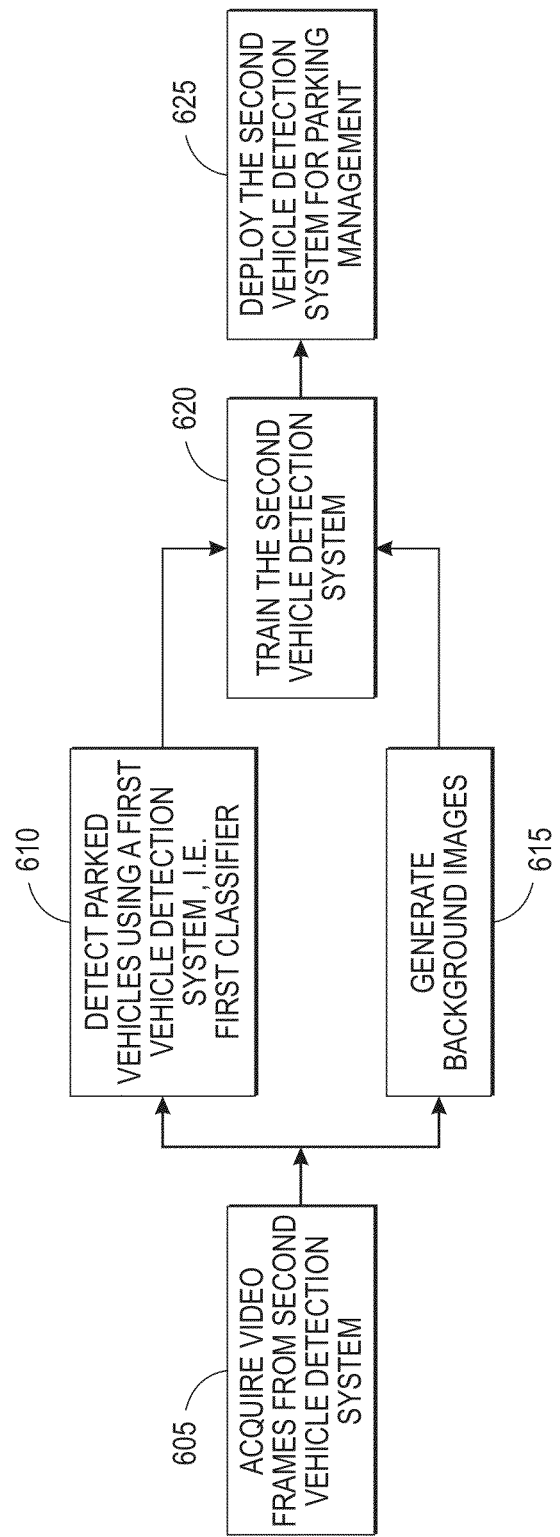
FIG. 6 is a system flowchart for an automated hierarchical training method for vehicle detection according to an exemplary embodiment of this disclosure.

A schematic of an exemplary method is show in FIG. 6. Note that, for purposes of this disclosure, first and second vehicle detection systems include systems and/or components which may be essentially identical from a hardware perspective.

Initially 605, video-frames are acquired from the second vehicle detection system, which will eventually be deployed.

Then 610, the acquired video frames are processed to generate high confidence positive (vehicle) training samples using a first vehicle detection system classifier. In addition, the acquired video frames from the second vehicle detection system are processed to generate high confidence negative (non-vehicle or background) training samples 615, which may or may not use the first classifier.

Then, 620, the second vehicle detection system classifier is trained using the positive and negative samples generated.

Finally, the second vehicle detection system is deployed for parking management 625.

According to one exemplary embodiment, generic training is used for the first classifier. In another embodiment, labeled training samples are captured from a first vehicle detection system with a FOV similar to the FOV of the second vehicle detection system and labeled. Then these training samples are used to train a first classifier for the given region and the training samples associated with the first vehicle detection system are used for subsequent detection systems that have similar views. Notably, this is a common scenario where there is a fixed pattern of mounting poles block-to-block, which are used to mount video cameras.

Provided below are detailed descriptions of two exemplary embodiments of a method of training a classifier operatively associated with a vehicle detection video system which is to be deployed.

The first embodiment uses a generically trained classifier on video taken from a video camera, the method performing additional special training of a refined classifier using the video output. The method then deploys the refined classifier camera for use with a vehicle detection system. According to this embodiment, the video camera with the generically trained classifier is referred to as a first vehicle detection system and a video camera with a refined classifier is referred to as a second vehicle detection system.

A second embodiment of a method of training a classifier operatively associated with a vehicle detection system which is to be deployed uses a first video camera to acquire video that is used for training a first classifier to form a first video detection system. The first classifier is then used to process video acquired from a second video camera including a field of view that is similar to that of the first video camera. The results of that classification are then used to perform additional special training to generate a refined classifier. The refined classifier is then deployed with the second video camera. According to this second embodiment, the first video camera including a trained first classifier is referred to as a first vehicle detection system and the second video camera including a second classifier is referred to as a second vehicle detection system.

Below is a more detailed description of the two exemplary embodiments, within the context of steps a)-d) as previously described.

(a) In a first camera vehicle detection system, train the system classifier using manually labeled image data or data labeled through some other means.

In the generically trained embodiment, a camera or cameras acquires video and trains the classifier for vehicle and non-vehicle detection. This step may be performed by a third party. In addition, the generic classifier may be configured as one or more of a weak classifier, color-based vehicle detector and a multi-view vehicle classifier. Examples include a HOG-SVM training multiple views rather than view-specific a SNoW classifier, a LPB-SVM classifier, a Texton type classifier, etc.

In the similar-view embodiment, images/videos of a scene are captured from a first camera installed and configured for parking management. The video frames are then processed for training the vehicle detection system for the specific site associated with the first camera.

(b) Acquire high confidence training samples for training a second vehicle detection system for a target region using the trained classifier associated with the first vehicle detection system. Here, the training samples are captured from the camera operatively associated with the second vehicle detection system.

Use the first vehicle detection classifier with the second vehicle detection system at the target region associated with the second vehicle detection system, where the vehicle detection threshold is set to minimize false positives for vehicle image regions to acquire high confidence positive (vehicle) samples for the training set.

Use the first vehicle detection classifier with the second detection system at the target region with a detection threshold set to minimize false negatives to acquire high confidence negative (non-vehicle) samples in the training set.

In this step, the first classifier is used to process video captured with the second vehicle detection system camera to detect parked vehicles in the acquired video frames, e.g., using either the generic vehicle detection algorithm, see P. Felzenszwalb, R. Girshick, D. McAllester, D. Ramanan, "Object Detection with Discriminatively Trained Part Based Models," IEEE Transactions on Pattern Analysis and Machine Intelligence, Vol. 32, No. 9, September 2010, or the similar view classifier. The objective at this stage is to automatically collect and label vehicle/non-vehicle image regions for the target site (pose, level of confusion due to background, etc.), and have high confidence in the labeling so it may be used in future training.

Consider the acquisition of positive samples (vehicle). It is tolerable to miss some vehicles (false-negative) but not acceptable to falsely consider a non-vehicle as a vehicle (false-positive). In other words, whenever a vehicle is detected there should be a high degree of confidence that there is a vehicle present. With this strategy and collecting samples over enough time, a large set of correctly labeled vehicle (positive) samples can be automatically collected for later training.

Concerned first with acquiring high confidence positive samples, it is recognized that this presents a significantly relaxed performance requirement for a vehicle detection system at this stage, i.e. completely ignoring the performance of false-negative. This relaxed requirement allows various detection methods to be employed. For example, a vehicle classifier from a well-trained similar site can be used, e.g., manually recognize and label vehicles for the site, then train accordingly, but setting a higher threshold for vehicle detection at the new site where positive samples are collected. As another example, a state-of-the-art generic vehicle detection classifier can be used to process video acquired by the second camera, while again setting a higher threshold for vehicle detection. See P. Felzenszwalb, R. Girshick, D. McAllester, D. Ramanan, "Object Detection With Discriminatively Trained Part-Based Models," IEEE Transactions on Pattern Analysis and Machine Intelligence, Vol. 32, No. 9, September 2010, pages 1627-1645. For yet another example, a simple color-based vehicle detection system can be used that only recognizes vehicles with unusual colors, e.g., far from neutral so that it would not be confused with road. All the classifiers discussed here can be used in a way that biases toward penalizing false-positives while allowing false-negatives (miss). Furthermore, the video frames can be pre-processed using video processing discussed in U.S. application Ser. No. 13/441,269, filed Apr. 6, 2012, by Bulan et al. and entitled "System And Method For Available Parking Space Estimation For Multispace On-Street Parking" and co-pending patent application entitled "Two-Dimensional And Three-Dimensional Sliding Window-Based Methods And Systems For Detecting Vehicles" by Bulan et al., such that the vehicle detection system is applied only on the candidate vehicle blobs, typically detected via motion or background subtraction in video processing. By doing so, the probability of false-positives can be further reduced. Note that it may also be beneficial to use more than one such first vehicle classifier to acquire, i.e. classify, training samples acquired from the target site system, especially when their underlying characteristics are complementary, e.g., color-based vs. edge-based. That is, the first vehicle classifier can mean a union of several vehicle classifiers motioned above that are all tuned to bias to allow false-negatives but not false-positives.

Analogous to the acquisition of high confidence positive sample at the target site, high confidence negative samples may be automatically collected and labeled for training a vehicle classifier at this location. One approach is to use a strategy similar to that used for positive samples but in a complementary manner. For example, instead of finding regions with a higher first classifier score associated with a vehicle, find regions with more negative classifier scores and label these regions as negative samples. Also, a simple alternative approach is to use video processing techniques, see U.S. application Ser. No. 13/441,269, filed Apr. 6, 2012, by Bulan et al. and entitled "System And Method For Available Parking Space Estimation For Multispace On-Street Parking" and co-pending patent application entitled "Two-Dimensional And Three-Dimensional Sliding Window-Based Methods And Systems For Detecting Vehicles" by Bulan et al., to identify background pixels through motion or background estimation and then crop out background image patches from those identified background pixels. The latter method does not require a classifier. It utilizes well-developed background or motion estimation methods for video processing.

Note that the time required to collect a sufficient set of training samples depends on the activity of the site, which may depend on the time of the day, weather, local business hours, etc. When the activity of vehicle parking is high, more parked vehicles will be detected but with fewer cropped background images, and vice versa.

(c) Use the high confidence images generated above at the target region to train the second vehicle detection system classifier.

Once a sufficient set of high confidence positive samples and negative samples are automatically collected, a classifier for use with the second vehicle detection system to be deployed is trained using a machine learning approach. Note that there are a few points worth mentioning here.

This second vehicle detection system using a new classifier trained with high confidence positive samples and negative samples collected from the target site will be more accurate for this site compared to simply using the first vehicle detection system classifier because the training samples, positive and negative, are collected from the target site. The training and deployment will share similar characteristics, such as pose and level of confusion from the background etc.

Iteration(s) can be performed to further improve the second vehicle detection classifier at the target location. It is also possible to replace part or all of the previous first vehicle detection system with the current second vehicle detection system and repeat the steps that build a high confidence training set and perform the training to arrive at a further refined second vehicle detection system. In such a situation, the training samples, positive and/or negative, from each iteration will accumulate for training this site-specific vehicle detection system.

(d) Deploy the second vehicle detection system to the targeted vision-based parking management system.

Once the training phase is completed, the site-specific vehicle detection system, i.e. second vehicle detection system is deployed to the targeted vision-based parking management system such as that in co-pending patent application entitled "Two-Dimensional And Three-Dimensional Sliding Window-Based Methods And Systems For Detecting Vehicles" by Bulan et al. Note that in the sample collection stage, it might be beneficial to randomly allocate a subset of the samples for validation and testing of the machine learning process.

As noted above, the disclosed hierarchical training method can be used for further refinement at the target site even after a system is deployed and being used for parking management. Taking this one step further, in some applications it may be desirable to eliminate the separate training phase altogether and deploy the vehicle detection system without training. In this case, the first vehicle detection system may be used to perform three tasks simultaneously before transitioning to the second detection system: (1) Normal vehicle detection with its normal detection accuracy; (2) Collect positive training samples as above; and (3) Collect negative training samples as above.

Note that the disclosed method will perform well for systems that have true positives and true negatives which are well separated in feature space, such as on-street parking where vehicles (true positive) and pavements (true negative) have distinct features. For on-street parking, when a scene is far from the camera so that it becomes small in image space and vehicles and background are not easily separated by the method described above, it may be beneficial to manually crop out some vehicles and background patches from the far scene and add them to the hierarchical training samples, then re-train the classifier.

With reference to FIGS. 9-12, provided are further descriptions of the vehicle detection methods and systems described hereto.

Figure 9:
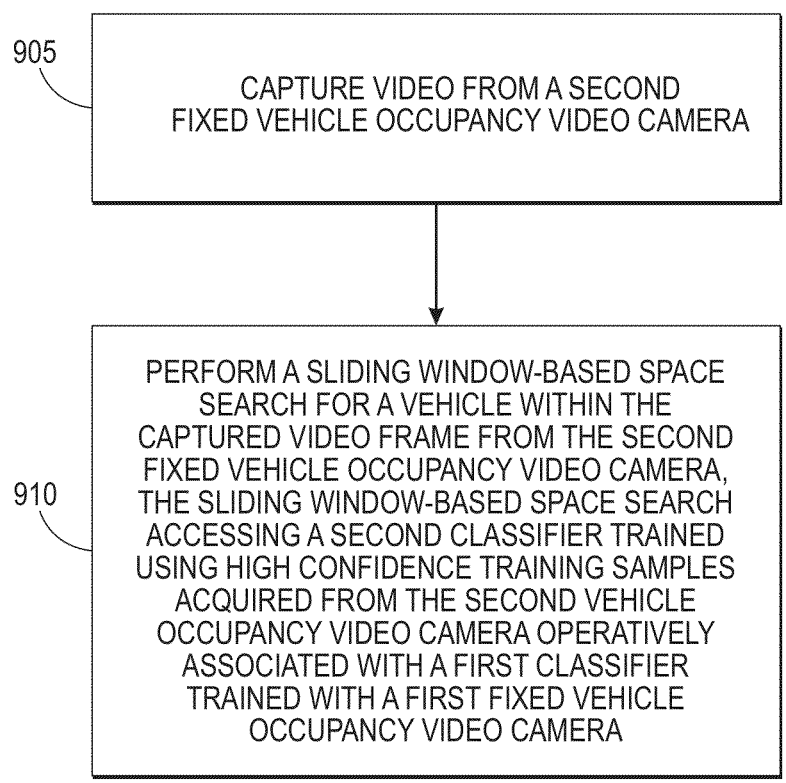
FIG. 9 is a flow chart of a method of detecting a vehicle according to an exemplary embodiment of this disclosure.

FIG. 9 is a flow chart of a method of detecting a vehicle according to an exemplary embodiment of this disclosure.

Initially 905, capture video from a second fixed vehicle occupancy video camera.

Then 910, perform a sliding window-based space search for a vehicle within the captured video frame from the second fixed vehicle occupancy video camera, the sliding window-based space search accessing a second classifier trained using high confidence training samples acquired from the second vehicle occupancy video camera operatively associated with a first classifier trained with a first fixed vehicle occupancy video camera.

Figure 10:
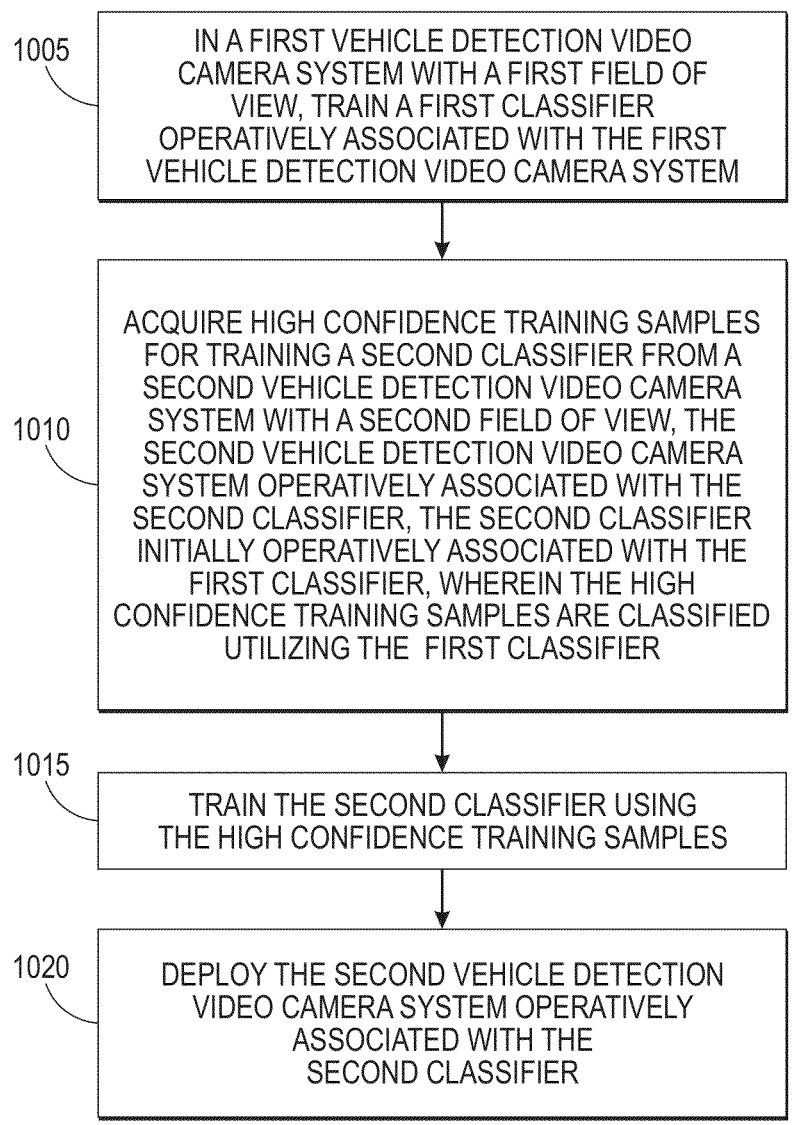
FIG. 10 is a flow chart of a method of training a classifier according to an exemplary embodiment of this disclosure.

FIG. 10 is a flow chart of a method of training a classifier according to an exemplary embodiment of this disclosure.

Initially 1005, in a first vehicle detection video camera system with a first field of view, train a first classifier operatively associated with the first vehicle detection video camera system.

Next 1010, acquire high confidence training samples for training a second classifier from a second vehicle detection video camera system with a second field of view, the second vehicle detection video camera system operatively associated with the second classifier, the second classifier initially operatively associated with the first classifier, wherein the high confidence training samples are classified utilizing the first classifier.

Next 1015, train the second classifier using the high confidence training samples.

Finally 1020, deploy the second vehicle detection video camera system operatively associated with the second classifier.

Figure 11:
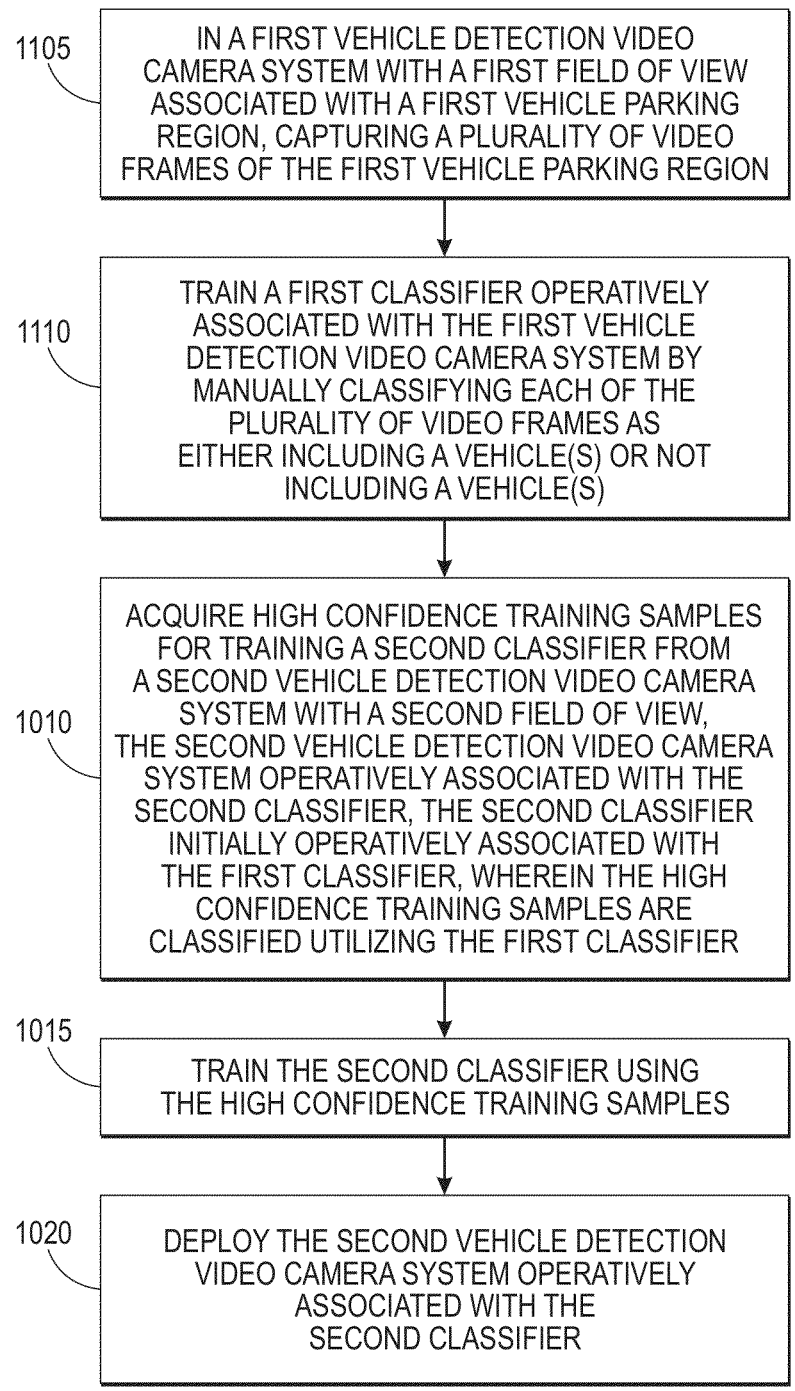
FIG. 11 is a flow chart of another method of training a second classifier according to an exemplary embodiment of this disclosure, including the manual classification of video frames associated with a first classifier.

FIG. 11 is a flow chart of another method of training a second classifier according to an exemplary embodiment of this disclosure, including the manual classification of video frames associated with a first classifier.

Initially 1105, in a first vehicle detection video camera system with a first field of view associated with a first vehicle parking region, capturing a plurality of video frames of the first vehicle parking region.

Next 1110, train a first classifier operatively associated with the first vehicle detection video camera system by manually classifying each of the plurality of video frames as either including a vehicle(s) or not including a vehicle(s).

Next 1010, acquire high confidence training samples for training a second classifier from a second vehicle detection video camera system with a second field of view, the second vehicle detection video camera system operatively associated with the second classifier, the second classifier initially operatively associated with the first classifier, wherein the high confidence training samples are classified utilizing the first classifier.

Next 1015, train the second classifier using the high confidence training samples.

Finally 1020, deploy the second vehicle detection video camera system operatively associated with the second classifier.

Figure 12:
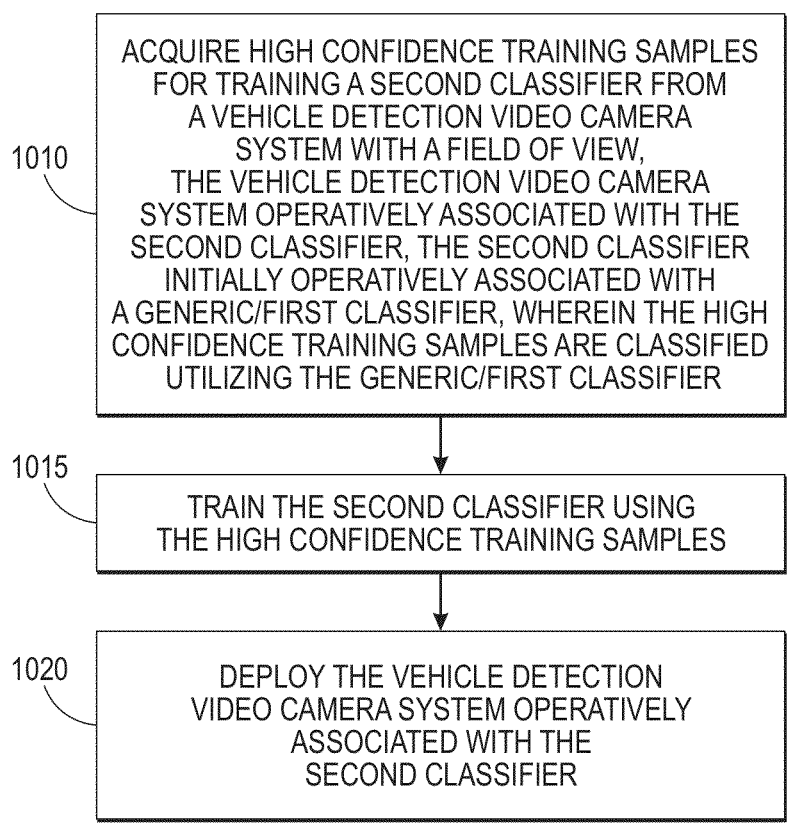
FIG. 12 is a flow chart of another method of training a second classifier according to an exemplary embodiment of this disclosure, including the use of a generic first classifier.

FIG. 12 is a flow chart of another method of training a second classifier according to an exemplary embodiment of this disclosure, including the use of a generic first classifier.

Initially 1010, acquire high confidence training samples for training a second classifier from a vehicle detection video camera with a second field of view, the vehicle detection video camera system operatively associated with the second classifier, the second classifier initially operatively associated with a generic/first classifier, wherein the high confidence training samples are classified utilizing the generic/first classifier.

Next 1015, train the second classifier using the high confidence training samples.

Finally 1020, deploy the vehicle detection video camera system operatively associated with the second classifier.

Figure 7:
FIG. 7 is a snap-shot of a first camera configuration including a half-block view.
Figure 8:
FIG. 8 is a snap-shot of a second camera configuration including a full-block view.

In an experiment, videos of two distinct camera configurations were used at a pilot site to illustrate the feasibility of the disclosed method and system. Example snap-shots of the two camera configurations are shown in FIGS. 7 and 8, respectively.

Manual Training and Testing of Config#1 Vehicle Detection System.

In order to obtain a decent starting point and to benchmark the disclosed method for two-level learning, the procedure discussed in "Two-Dimensional And Three-Dimensional Sliding Window-Based Methods And Systems For Detecting Vehicles" by Bulan et al. was followed to manually learn a vehicle detection system for Config#1. Additionally, its performance was tested as an optimal baseline performance for a vehicle detection system used in vision-based parking management. More specifically, three days of videos were manually scanned and cropped of all parked distinct vehicles as positive samples for training. For negative samples, 500 samples were randomly generated by following a procedure similar to the video-based method discussed above, i.e., use video processing to get low activity regions or frames and crop the background at random position with size similar to the size of a crop vehicle. These positive and negative samples were then used to train a HOG-SVM classifier for a Config#1 vehicle detection system. This system was then tested on videos from 2 days that were not used for obtaining training samples. Table 2 shows the size of the training set for this manual process and the resulting performance of the 2-day test videos. Note that for this experiment, the vehicle detection performance was assessed by running it independent without any other video & image processing steps so the results were not confounded by other processing occurring in the vision-based parking management system. The assessment was done by running the vehicle detection system on still images extracted from the test video every 20 minutes.

TABLE 2

Manual training set information and testing performance for Config #1 vehicle detection system

| Training set (4-day videos) | | Testing performance (2-day videos) | |
|---|---|---|---|
| No. of positive sample (manual crop) | 407 | True positive | 74/75 (98.7%) |
| No. of negative sample (random crop) | 482 | False positive | 0/75 (0%) |

Automated Two-Level Training and Testing of Config#2 Vehicle Detection System.

For this experiment, the Config#1 vehicle classifier was used with a high threshold setting (e.g., 1.2 rather than the typical value of 0.6) as the first generic classifier to automatically crop out parked vehicles in Config#2 for later refinement of training. This process was performed on 4-day training videos (1 still image every 5 minutes). Examination of the results from one of the four training videos revealed this process extracted only about 16.6% parked vehicles, but without any false-positives. These auto-cropped samples were used as positive samples for training the second vehicle classifier. For automated generation of negative samples, the same procedure as the video processing method above was used. These samples were then used to train the hierarchical trained Config#2 vehicle detection system, i.e. the second vehicle classifier. Table 3 shows the size of the training set for this automated process and the resulting performance on the 2-day test videos.

TABLE 3

Automated training set information and testing performance for hierarchical trained Config #2 vehicle detection system

| Training set (4-day videos) | | Testing performance (2-day videos) | |
|---|---|---|---|
| No. of positive sample (auto crop) | 361 | True positive | 160/184 (85.0%) |
| No. of negative sample (random crop) | 507 | False positive | 3/184 (1.6%) |

Performance Comparison of Config#2 Vehicle Detection System.

In order to have a clear view of the performance achieved by the disclosed method, two additional tests were conducted: naïve deployment vs. fully manual retrain method. For the native deployment test, it is assumed that manually trained Config#1 vehicle classifier is good enough as-is for the other camera configuration. This option reqired the least amount of work, but the concern is that the performance may not be sufficient. On the other extreme, a deployment strategy can always include a fully manual retrain method. This would give the best performance a system can achieve but requires the largest amount of work. The ideal situation is that the disclosed method performs close to fully a manual retrain method. Tables 4 and 5 show the size of the training set and the resulting performance on the 2-day test videos for naive deployment & fully manual retrain method, respectively.

TABLE 4

Training set information and testing performance for naïve Config #2 vehicle detection system

| Training set (4-day videos) | | Testing performance (2-day videos) | |
|---|---|---|---|
| No. of positive sample | 0 | True positive | 120/184 (65.2%) |
| No. of negative sample | 0 | False positive | 12/184 (6.5%) |

TABLE 5

Training set information and testing performance for fully manual re-trained Config #2 vehicle detection system

| Training set (4-day videos) | | Testing performance (2-day videos) | |
|---|---|---|---|
| No. of positive sample (auto crop) | 216 | True positive | 178/184 (96.7%) |
| No. of negative sample (random crop) | 507 | False positive | 4/184 (2.2%) |

As can be seen from Table 3-5, the disclosed method improves ~20% accuracy over naïve method but still falls short for about 10% over the optimal solution. Here are some discussions and observations after further examining the experiment.

Though it may seem that the disclosed method (Table 3) gathers more parked vehicles than manual cropping (Table 5), it should be noted the automated method cropped duplicated parked vehicles while the manual method did not. Hence, one should not be misled by the number and conclude there are more distinct positive training samples in an automated method. In fact, the automated method only cropped out about one-sixth of all parked vehicles. Hence, it may be beneficial to run automated cropping for more days to collect a comparable number of distinct positive samples or run an additional complementary vehicle classifier (e.g. color-based rather than HOG-based) as an additional first vehicle classifier.

The 10% performance shortage came mainly from lacking two types of positive training samples via auto-crop. The first kind of failure is vehicles parked at the far end of the camera view. These vehicles are more blurry and tend to have lower HOG-SVM classifier scores. As a result, the automated method was unable to detect and crop them due to the choice of a high threshold in the first vehicle classifier. One potential solution is to set a variable threshold in the first vehicle classifier based on detected spatial location. The other solution is to have another complementary first vehicle classifier that is less sensitive to edge blur (e.g. a color-based vehicle classifier). The second kind of failure is a vehicle with a distinct edge-profile. For this kind of failure, collecting more distinct positive training samples is one solution.

Figure 13:
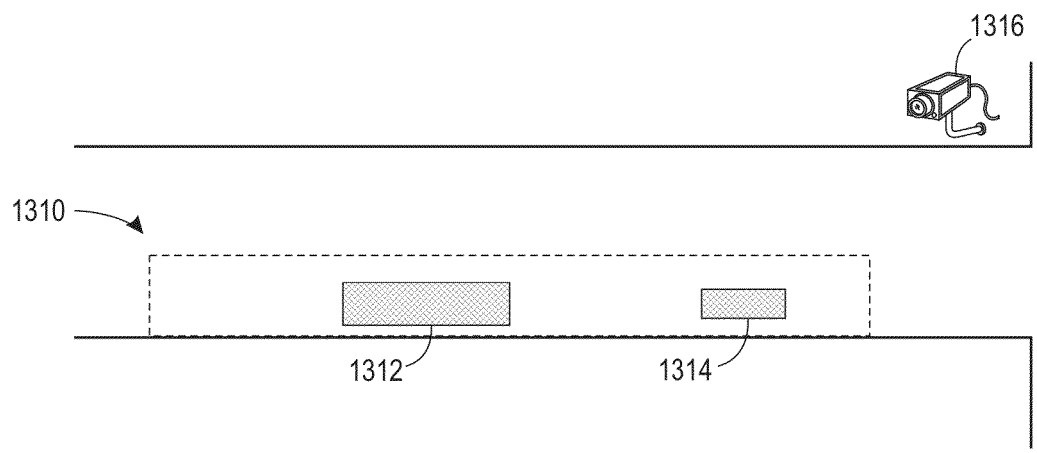
FIG. 13 is one example of a vehicle detection system configuration according to an exemplary embodiment of this disclosure.

With reference to FIG. 13, illustrated is a diagram of the geometric configuration associated with one exemplary embodiment of a vehicle detection system according to this disclosure. The vehicle detection system includes a fixed video camera 1316 and a parking region, i.e. ROI, 1310. The parking region includes parked vehicles 1312 and 1314, but may include more or less parked vehicles.

Figure 14:
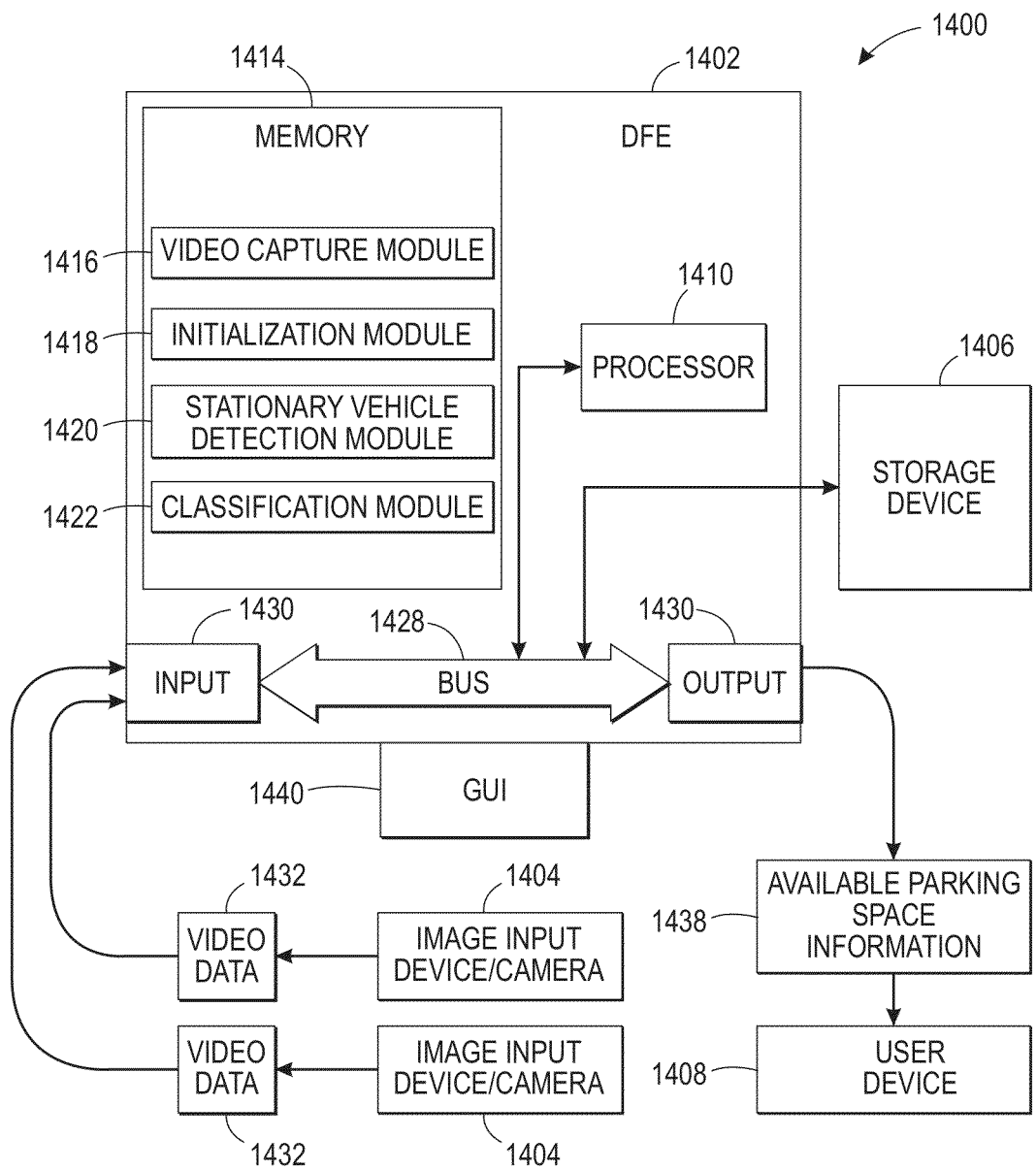
FIG. 14 is a block diagram of a vehicle detection system according to an exemplary embodiment of this disclosure.

FIG. 14 is a schematic illustration of a parking space determination system 1400 according to one exemplary embodiment, the system including a vehicle detection system as described herein. The system includes a determination device 1402, an image capture device 1404, and a storage device 1406, which may be linked together by communication links, referred to herein as a network. In one embodiment, the system 1400 may be in further communication with a user device 1408. These components are described in greater detail below.

The determination device 1402 illustrated in FIG. 14 includes a controller that is part of or associated with the determination device 1402. The exemplary controller is adapted for controlling an analysis of video data received by the system 1400. The controller includes a processor 1410, which controls the overall operation of the determination device 1402 by execution of processing instructions that are stored in memory 1414 connected to the processor 1410.

The memory 1414 may represent any type of tangible computer readable medium such as random access memory (RAM), read only memory (ROM), magnetic disk or tape, optical disk, flash memory, or holographic memory. In one embodiment, the memory 1414 comprises a combination of random access memory and read only memory. The digital processor 1410 can be variously embodied, such as by a single-core processor, a dual-core processor (or more generally by a multiple-core processor), a digital processor and cooperating math coprocessor, a digital controller, or the like. The digital processor, in addition to controlling the operation of the determination device 1402, executes instructions stored in memory 1414 for performing the parts of a method discussed herein. In some embodiments, the processor 1410 and memory 1414 may be combined in a single chip.

The determination device 1402 may be embodied in a networked device, such as the image capture device 1404, although it is also contemplated that the determination device 1402 may be located elsewhere on a network to which the system 1400 is connected, such as on a central server, a networked computer, or the like, or distributed throughout the network or otherwise accessible thereto. The video data analysis, i.e. vehicle detection, phases disclosed herein are performed by the processor 1410 according to the instructions contained in the memory 1414. In particular, the memory 1414 stores a video capture module 1416, which captures video data of a parking area of interest; an initialization module 1418, which initializes the system; and a stationary vehicle detection module 1420, which detects vehicles that are in the parking area of interest; a classification module 1422, which classify whether a ROI includes a vehicle parked in the area of interest. Embodiments are contemplated wherein these instructions can be stored in a single module or as multiple modules embodied in the different devices.

The software modules as used herein, are intended to encompass any collection or set of instructions executable by the determination device 1402 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server (not shown) or other location to perform certain functions. The various components of the determination device 1402 may be all connected by a bus 1428.

With continued reference to FIG. 14, the determination device 1402 also includes one or more communication interfaces 1430, such as network interfaces, for communicating with external devices. The communication interfaces 1430 may include, for example, a modem, a router, a cable, and and/or Ethernet port, etc. The communication interfaces 1430 are adapted to receive video and/or image data 1432 as input.

The determination device 1402 may include one or more special purpose or general purpose computing devices, such as a server computer or digital front end (DFE), or any other computing device capable of executing instructions for performing the exemplary method.

FIG. 14 further illustrates the determination device 1402 connected to an image source 1404 for inputting and/or receiving the video data and/or image data (hereinafter collectively referred to as "video data") in electronic format. The image source 1404 may include an image capture device, such as a camera. The image source 1404 can include one or more surveillance cameras that capture video data from the parking area of interest. For performing the method at night in parking areas without external sources of illumination, the cameras 1404 can include near infrared (NIR) capabilities at the low-end portion of a near-infrared spectrum (700 nm-1000 nm).

In one embodiment, the image source 1404 can be a device adapted to relay and/or transmit the video captured by the camera to the determination device 1402. For example, the image source 1404 can include a computer, or the like. In another embodiment, the video data 1432 may be input from any suitable source, such as a workstation, a database, a memory storage device, such as a disk, or the like. The image source 1404 is in communication with the controller containing the processor 1410 and memory 1414.

With continued reference to FIG. 14, the system 1400 includes a storage device 1406 that is part of or in communication with the determination device 1402. In a contemplated embodiment, the determination device 1402 can be in communication with a server (not shown) that includes a processing device and memory, such as storage device 1406.

With continued reference to FIG. 14, the video data 1432 undergoes processing by the determination device 1402 to output a determination 1438 regarding parking space availability to an operator in a suitable form on a graphic user interface (GUI) 1440 or to a user device 1408, such as a smart phone belonging to a driver in transit or to vehicle computer and/or GPS system, that is in communication with the determination device 1402. The GUI 1440 can include a display, for displaying information, such as the parking space availability and dimension, to users, and a user input device, such as a keyboard or touch or writable screen, for receiving instructions as input, and/or a cursor control device, such as a mouse, trackball, or the like, for communicating user input information and command selections to the processor 1410.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer implemented method of detecting a vehicle in video, the video acquired from a fixed parking occupancy video camera including a field of view associated with a parking region, the method comprising:
    a) capturing video from the fixed parking occupancy video camera; and
    b) performing a sliding window-based space search for a vehicle within the captured video, the sliding window-based space search extracting one or more features associated with each of a plurality of windows and accessing an operatively associated second classifier to classify each window as including a vehicle or not including a vehicle,
    wherein the second classifier is trained using high confidence training samples acquired from samples of video obtained from the fixed parking occupancy video camera operatively associated with a first classifier, the samples including positive (vehicle) samples of video and negative (non-vehicle) samples of video, and
    wherein the first classifier is trained with video captured from another fixed parking occupancy video camera including a different field of view associated with another parking region.

2. The method of detecting a vehicle in video according to claim 1, wherein the first classifier is configured as a generic classifier.

3. The method of detecting a vehicle in video according to claim 1, wherein the second classifier is trained using high confidence positive (vehicle) training samples acquired from the fixed parking occupancy video camera operatively associated with the first classifier.

4. The method of detecting a vehicle in video according to claim 1, wherein the second classifier is trained using high confidence negative (non-vehicle) training samples acquired from the fixed parking occupancy video camera without the use of the first classifier.

5. The method of detecting a vehicle in video according to claim 1, wherein the high confidence positive training samples are obtained by configuring a vehicle detection threshold to minimize false positive detections of vehicle associated with the samples of video.

6. The method of detecting a vehicle in video according to claim 1, wherein the high confidence negative training samples are obtained by configuring a vehicle detection threshold to minimize false negative detections associated with the samples of video.

7. The method of detecting a vehicle in video according to claim 1, wherein the first classifier is trained with manually labeled image data captured from another fixed parking occupancy video camera including a different field of view associated with another parking region.

8. The method of detecting a vehicle in video according to claim 1, wherein the second classifier is trained using a machine learning process.

9. The method of detecting a vehicle in video according to claim 1, wherein the second classifier is trained by iteratively modifying all or part of the first classifier to include a current version of the second classifier, acquiring high confidence training samples from samples of video obtained from the fixed parking occupancy video camera operatively associated with the first classifier, and training the second classifier using the high confidence training samples.

10. A computer implemented method of detecting a video, the video acquired from a fixed parking occupancy video camera including a field of view associated with a parking region, the method comprising:

a) capturing video from the fixed parking occupancy video camera; and b) performing a sliding window-based space search for a vehicle within the captured video, the sliding window-based space search extracting one or more features associated with each of a plurality of windows and accessing an operatively associated second classifier to classify each window as including a vehicle or not including a vehicle, wherein the second classifier is trained using high confidence training samples acquired from samples of video obtained from the fixed parking occupancy video camera operatively associated with a first classifier, the samples including positive (vehicle) samples of video and negative (non-vehicle) samples of video, and wherein the positive (vehicle) samples of video are associated with a sub-region of a video-frame, the sub-region related to a ROI (Region of Interest).

11. The method of detecting a vehicle in video according to claim 10, wherein the generic classifier is configured as one or more of a weak classifier, a color-based vehicle detector, and a multi-view vehicle classifier.

12. A vehicle detection system associated with a parking region, the vehicle detection system comprising:

a fixed parking occupancy video camera including a field of view associated with the parking region; and a controller operatively associated with the fixed parking occupancy video camera, the controller configured to execute computer instructions to perform a process of detecting a vehicle in video including:

a) capturing video from the fixed parking occupancy video camera; and b) performing a sliding window-based space search for a vehicle within the captured video, the sliding window-based space search extracting one or more features associated with each of a plurality of windows and accessing a second classifier to classify each window as including a vehicle or not including a vehicle, wherein the second classifier is trained using high confidence training samples acquired from samples of video obtained from the parking occupancy video camera operatively associated with a first classifier, the samples including positive (vehicle) samples of video and negative (non-vehicle) samples of video, and wherein the first classifier is trained with video captured from another fixed parking occupancy video camera including a different field of view associated with another parking region.

13. The vehicle detection system associated with a parking region according to claim 12, wherein the generic classifier is configured as one or more of a weak classifier, a color-based vehicle detector, and a multi-view vehicle classifier.

14. The vehicle detection system associated with a parking region according to claim 12, wherein the first classifier is configured as a generic classifier.

15. The vehicle detection system associated with a parking region according to claim 12, wherein the second classifier is trained using high confidence positive (vehicle) training samples acquired from the fixed parking occupancy video camera operatively associated with the first classifier.

16. The vehicle detection system associated with a parking region according to claim 12, wherein the second classifier is trained using high confidence negative (non-vehicle) training samples acquired from the fixed parking occupancy video camera without the use of the first classifier.

17. The vehicle detection system associated with a parking region according to claim 12, wherein the high confidence positive training samples are obtained by configuring a vehicle detection threshold to minimize false positive detections of vehicle associated with the samples of video.

18. The vehicle detection system associated with a parking region according to claim 12, wherein the high confidence negative training samples are obtained by configuring a vehicle detection threshold to minimize false negative detections associated with the samples of video.

19. The vehicle detection system associated with a parking region according to claim 12, wherein the first classifier is trained with manually labeled image data captured from another fixed parking occupancy video camera including a different field of view associated with another parking region.

20. The vehicle detection system associated with a parking region according to claim 12, wherein the second classifier is trained using a machine learning process.

21. The vehicle detection system associated with a parking region according to claim 12, wherein the second classifier is trained by iteratively modifying all or part of the first classifier to include a current version of the second classifier, acquiring high confidence training samples from samples of video obtained from the fixed parking occupancy video camera operatively associated with the first classifier, and training the second classifier using the high confidence training samples.

22. A vehicle detection system associated with a parking region, the vehicle detection system comprising:

a fixed parking occupancy video camera including a field of view associated with the parking region; and a controller operatively associated with the fixed parking occupancy video camera, the controller configured to execute computer instructions to perform a process of detecting a vehicle in video including:

a) capturing video from the fixed parking occupancy video camera; and b) performing a sliding window-based space search for a vehicle within the captured video, the sliding window-based space search extracting one or more features associated with each of a plurality of windows and accessing a second classifier to classify each window as including a vehicle or not including a vehicle, wherein the second classifier is trained using high confidence training samples acquired from samples of video obtained from the parking occupancy video camera operatively associated with a first classifier, the samples including positive (vehicle) samples of video and negative (non-vehicle) samples of video, and wherein the positive (vehicle) samples of video are associated with a sub-region of a video frame, the sub-region related to a ROI (Region of Interest).

* * * * *